United States Patent
Siegel

(10) Patent No.: US 11,719,216 B2
(45) Date of Patent: Aug. 8, 2023

(54) CYCLOIDAL WAVE ENERGY CONVERTER USING FIXED DIFFERENTIAL BUOYANCY TO CONTROL OPERATING TORQUES

(71) Applicant: Atargis Energy Corporation, Pueblo, CO (US)

(72) Inventor: Stefan G. Siegel, Pueblo, CO (US)

(*) Notice: Subject to any disclaimer, the term of this patent is extended or adjusted under 35 U.S.C. 154(b) by 0 days.

(21) Appl. No.: 17/218,828

(22) Filed: Mar. 31, 2021

(65) Prior Publication Data

US 2022/0316438 A1 Oct. 6, 2022

(51) Int. Cl.
*F03B 13/16* (2006.01)
*F03B 13/10* (2006.01)

(52) U.S. Cl.
CPC .............. *F03B 13/16* (2013.01); *F03B 13/10* (2013.01); *F05B 2220/32* (2013.01); *F05B 2240/95* (2013.01)

(58) Field of Classification Search
CPC .......... F03B 13/16; F03B 13/10; F03B 13/18; F03B 2240/95; F03B 2220/32
See application file for complete search history.

(56) References Cited

U.S. PATENT DOCUMENTS

| | | | |
|---|---|---|---|
| 7,686,583 B2 | 3/2010 | Siegel | |
| 7,762,776 B2 | 7/2010 | Siegel | |
| 8,100,650 B2 | 1/2012 | Siegel | |
| 8,937,395 B2 | 1/2015 | Siegel | |
| 9,115,687 B2 | 8/2015 | Siegel | |
| 9,297,351 B2 | 3/2016 | Siegel | |
| 9,587,620 B2 * | 3/2017 | Rhinefrank | F03B 13/14 |
| 2008/0018115 A1 * | 1/2008 | Orlov | F03B 17/061 290/54 |
| 2013/0229013 A1 * | 9/2013 | Scharmann | F03B 13/10 290/53 |

\* cited by examiner

*Primary Examiner* — Tulsidas C Patel
*Assistant Examiner* — S. Mikailoff
(74) *Attorney, Agent, or Firm* — David Millers

(57) ABSTRACT

A floating mooring system for a single CycWEC applies counter forces and torques to keep a generator suitably stationary for power generation without requiring fixed attachments to the ocean floor or requiring a large frame interconnecting multiple CycWECs. The mooring system uses floats or floatation structure with differential ballasting to counter operating torque and drag plates to counter reactive forces. The floatation structures may be used to float the CycWEC for transport to a deployment location, where changing the overall ballasting of the floatation structures submerges the CycWEC to a desired depth and differential ballasting in the floatation structures counts expected operating torques.

21 Claims, 6 Drawing Sheets

CYCLOIDAL WAVE ENERGY CONVERTER USING FIXED DIFFERENTIAL BUOYANCY TO CONTROL OPERATING TORQUES

FEDERALLY SPONSORED RESEARCH OR DEVELOPMENT

This invention was made with government support under grant No. DE-EE0008626 awarded by the Department of Energy. The government has certain rights in the invention.

BACKGROUND

A Wave Energy Converter (WEC) is a system for converting the energy of waves into usable energy. Particularly, WECs may be deployed in the ocean to produces electric power from ocean waves. WECs are particularly desirable because WECs produce electrical energy without producing green house gases such as $CO_2$ (or any waste product) and WECs can produce electrical energy when other "green" energy systems are dormant or inefficient. For example, WECs can efficiently produce power at night when solar energy systems are inoperable and may even produce power in light wind conditions when wind power is inefficient.

A Cycloidal Wave Energy Convert (CycWEC) is a type of WEC that uses hydrofoils that move in a circle and interact with incoming ocean waves to create lift that directly applies torque to rotate a shaft and drive a generator. CycWECs have been shown to provide high conversion efficiency when compared to more traditional WEC systems that employ floats that move vertically up and down and need crankshaft mechanics to generate torque that turns a shaft.

Installation of a WEC of any kind generally requires a mooring system to maintain the WEC in position to interact with ocean waves, extract energy, and deliver converted electrical energy. In some applications, a mooring system may need to be commissioned, operated, and decommissioned in deep water, where anchoring to an ocean floor may be impractical. Even in shallower water where the ocean floor may be more easily reached, a mooring may be desired that does not require anchoring to or disturbing the ocean floor. Providing such a mooring system that meets the requirements of a WEC and particularly the unique requirements of a CycWEC may be challenging and new mooring systems are needed.

BRIEF DESCRIPTION OF THE DRAWINGS

FIG. 2 shows a perspective view of a stator frame in accordance with an example of the present disclosure including drag plates in a T-shaped configuration.

FIG. 3 shows a perspective view of a stator frame in accordance with an example of the present disclosure including drag plates having a two-piece configuration.

FIGS. 4-1 and 4-2 illustrate lift forces, shaft torques, and float-buoyancy forces in a CycWEC in an operational mode in accordance with an example of the present disclosure.

FIGS. 5-1 and 5-2 respectively show side and top views of a floating cycloidal wave energy converter system in accordance with an example of the present disclosure employing mooring lines and active control systems.

The drawings illustrate examples for the purpose of explanation and are not of the invention itself. Use of the same reference symbols in different figures indicates similar or identical items.

DETAILED DESCRIPTION

Figure 1:
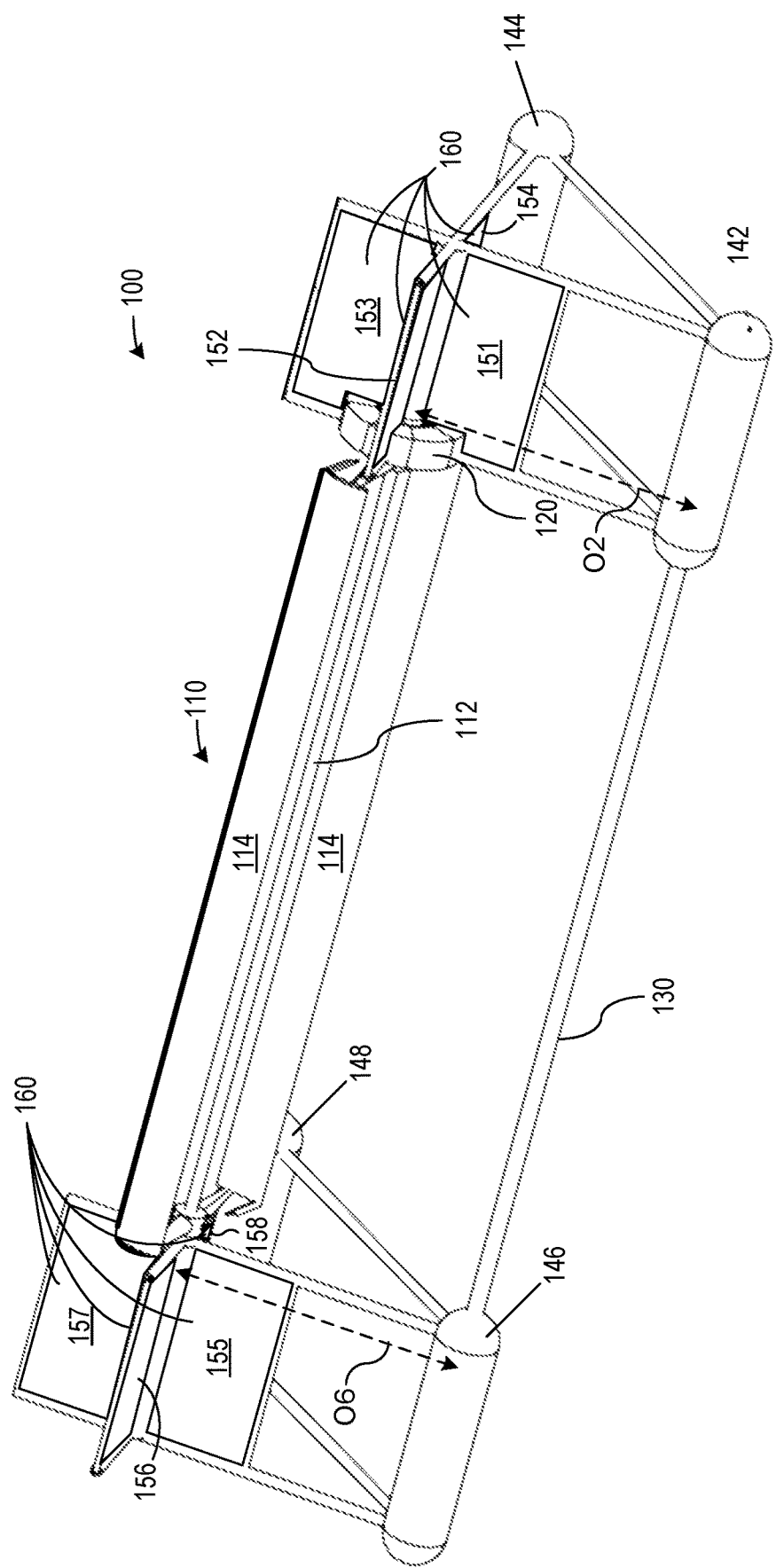
FIGS. 1-1, 1-2, and 1-3 respectively show perspective, side, and section views of a single free floating CycWEC system in accordance with an example of the present disclosure.

A mooring system for a Cycloidal Wave Energy Converter (CycWEC) generally needs to hold a portion, e.g., the stator, of a generator stationary so that the CycWEC is able to rotate the rotor relative to the stator of the generator and thereby generate electric power. A conventional approach for such mooring is to provide a rigid attachment to the ocean floor that prevents the stator portion of the generator from rotating. This approach may be feasible and economical in shallow and intermediate depth waters. However, in very deep water, structures that extend to the ocean floor become large and uneconomical to construct. If multiple CycWECs are installed in a suitable cluster, operation of the WECs such as detailed in U.S. Pat. No. 9,297,351, entitled "Clustering of Cycloidal Wave Energy Converters" can cause the CycWECs to generate counter torques for each other. However, since the necessary spacing between the individual CycWECs in a cluster scales with the typical wavelength of the incoming waves, the connecting structure between the CycWECs may become large and uneconomical. As disclosed herein, a floating mooring system for a single CycWEC may operate to generated and apply counter forces and counter torques to keep the required portion of a generator suitably stationary without requiring rigid attachments to the ocean floor or requiring a large frame that combines multiple CycWECs in a cluster.

In accordance with an aspect of the invention, systems and processes for a floating mooring are suitable for deep water and permit operation and maintenance of a single CycWEC that may float alone without any additional CycWECs to cancel reactive forces. The mooring systems and methods are not limited to deep water installations and can be utilized in shallow and intermediate depth waters as well. In general, operation of a CycWEC held in a floating mooring system creates reactive torques and forces, but the mooring system may use floats or other buoyant structures with differential ballasting to counter the reactive torques and/or drag plates to counter reactive forces. The floats may particularly be positioned and ballasted so that differences in buoyancy forces create a torque that counters the reactive torque that CycWEC operation generates. The drag plates may specifically counteract hydrofoil lift forces.

A single CycWEC system with floats and drag plates as described herein may operate in water of any depth since, in principle, both torques and forces on the system may be balanced without need of any connection to the ocean floor or to another CycWEC. However, one or more mooring lines may be used for station keeping or submergence or orientation control. Alternatively or additionally, an advanced dynamic station keeping control system may control the lift created by the CycWEC hydrofoils to perform station keeping and submergence control functions and may provide more precise position keeping capabilities than do conventional mooring lines. A floating mooring system capable of neutralizing reactive forces and torques in a single CycWEC system is particularly advantageous for a CycWEC of high power operating in ocean waves of large wavelengths, where a cluster-based installation may not be economical due to the size and costs of structures needed to connect multiple large CycWECs to each other.

Example Structures

Figures 1, 2:
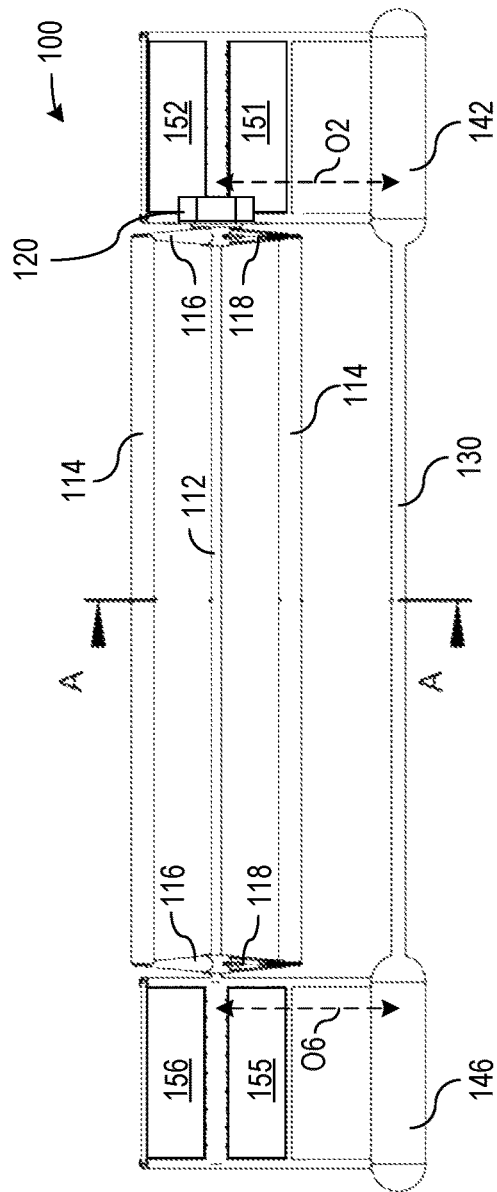
Figures 1, 2, 3:
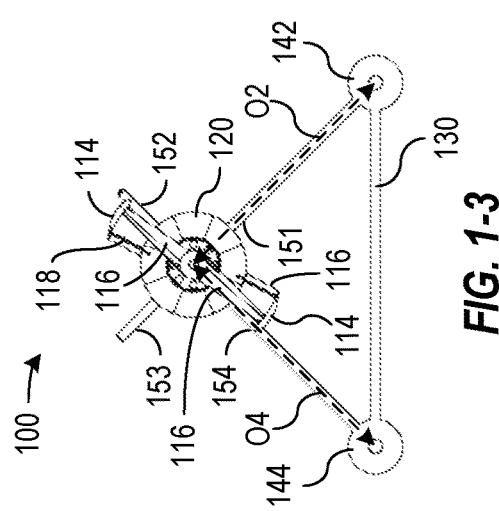
Figure 2:
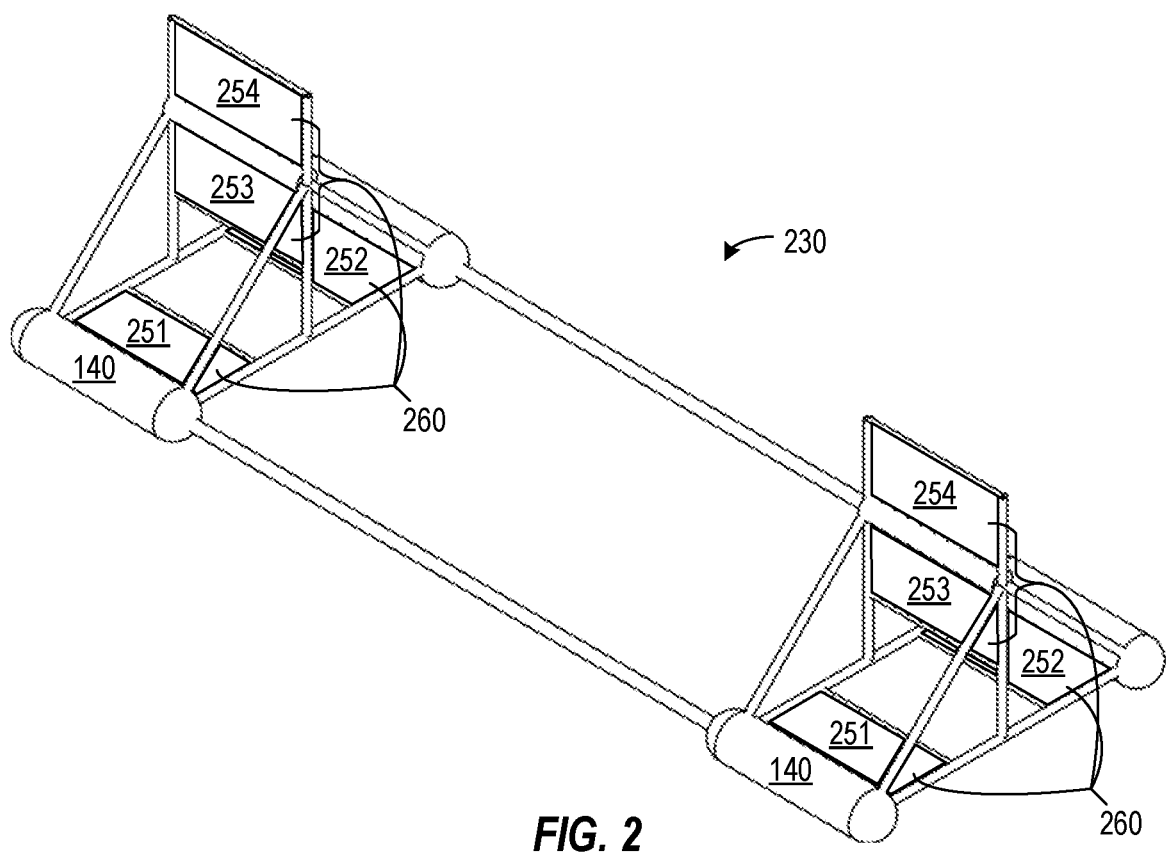
Figure 3:
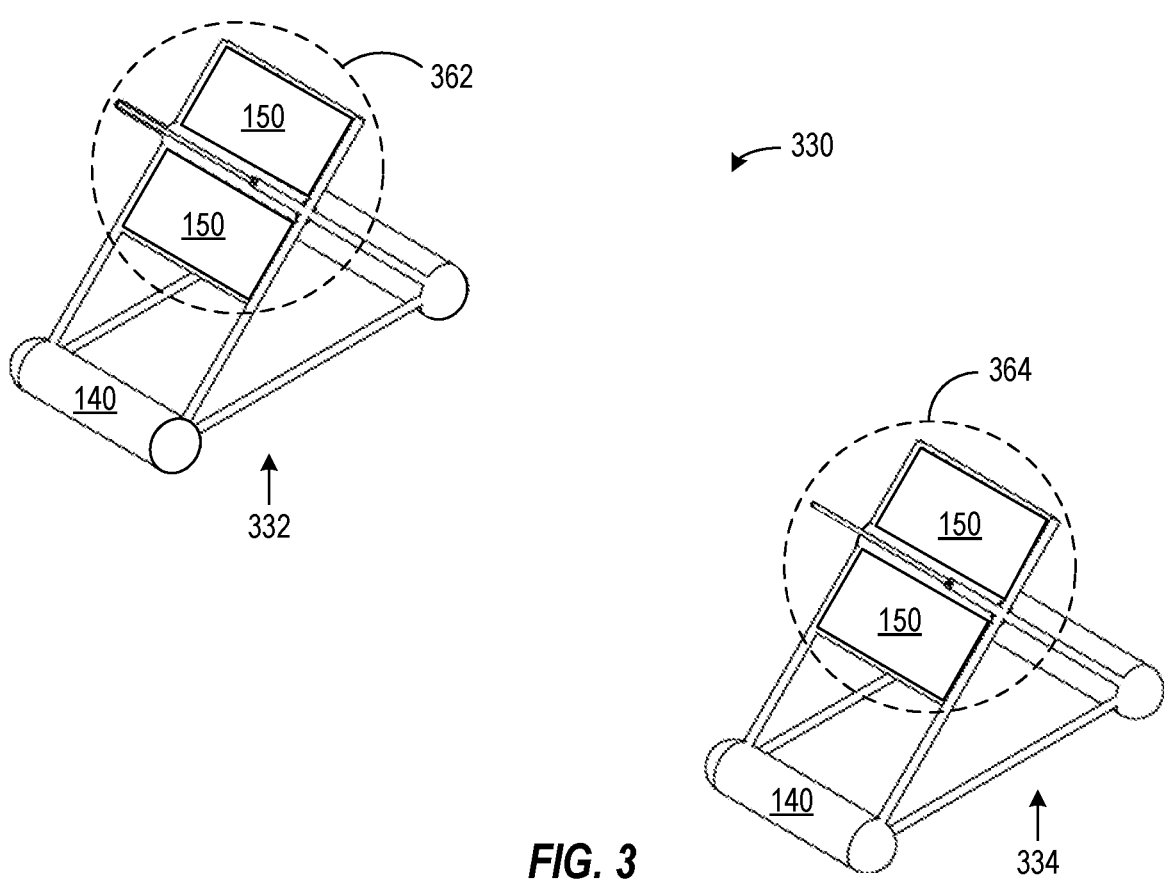

FIGS. 1-1, 1-2, and 1-3 respectively show perspective, side, and section views of a floating single CycWEC system 100 system in accordance with an example of the present disclosure. CycWEC system 100 floats in the sense that buoyancy forces support CycWEC system and CycWEC system 100 does not required a support structure to counteract the downward force. As described further below, CycWEC system 100 generally floats at depth that fully submerges CycWEC system 100 (or at least submerges a rotor 110 of CycWEC system 100). CycWEC system 100 is a single-CycWEC system in that CycWEC system 100 includes a single CycWEC rotor 110, although one or multiple generators 120 that convert rotation of rotor 110 into electric energy may be employed in the single CycWEC system 100.

As shown, rotor 110 of CycWEC system 100 has a central shaft 112 connected to generator(s) 120 and includes one or more blades or hydrofoils 114 on struts 116 connected to central shaft 112. During operation in ocean waves, an interaction of hydrofoils 114 with the waves passing through or around CycWEC rotor 110 creates lift, and the lift forces on hydrofoils 114 cause a torque that rotates rotor 110 relative to the stator portion(s) of generator(s) 120. The lift and the resistance of generator 120 to rotation also would cause CycWEC system 100 to move or rotate unless balanced by counter forces or torques as described further below.

One or more generators 120 are fixed mounted on a stator frame 130. Stator frame 130 provides a platform or tubular frame that holds a "stationary" portion, e.g., the stator(s) of generator(s) 120, of CycWEC system 100 and that permits rotor 110 to rotate relative to the stationary portion of generators 120. In addition, stator frame 130 includes multiple floats or other buoyant structures 142, 144, 146, and 148 (sometimes generically referred to herein as floats 140) and multiple drag plates 151, 152, 153, 154, 155, 156, 157, and 158 (sometimes generically referred to herein as drag plates 150). Stator frame 130 is generally shaped to include a base, in this case a rectangular base with floats 142, 144, 146, and 148 at the corners of the rectangular base, and a riser on which rotor 110 and generator(s) 120 are mounted offset, e.g., above, a center line of the base. In other implementations, two or more buoyant structures or floats 140, which may extend along the length of rotor 110, may provide a base that is sufficient to support rotor 110 on a riser structure. As described further below, this geometry allows rotor 110 and generator(s) 120 to be held stable and raised above the ocean surface when floats 140 have their maximum buoyancy.

Each float 140 has an adjustable ballast. For example, floats 140 may be generally hollow tanks or other structures made of steel, fiber reinforced plastic, aluminum, or other material suitable for use in offshore construction, and each float 140 may be filled or ballasted with adjustable amounts of gas, liquid, or solid material as needed to set or control the buoyancy of each float 140. In some embodiments, floats 140 may have fittings for connection to a pump or gas pressure system that able to change how each float 140 is ballasted and therefore change the buoyancy of the floats 140. In some embodiments, the pump or gas pressure system (not shown) may be installed on stator frame 130. During installation or a service mode, the ballasts may be adjusted to make floats 140 sufficiently buoyant to float CycWEC system 100 and keep the CycWEC above water and allow towing of CycWEC system to a deployment location. At the deployment location, the adjustable ballasts of floats 140 may be collectively set so that CycWEC system 100 as a whole is neutrally buoyant or otherwise able to float at a desired operational depth. In the illustrated configuration, CycWEC 400 has four floats 140 arranged in pairs, and in each pair one float 142 or 146 has an offset O2 or O6 from rotor 110 and that is at least partly opposing or opposite to the offset O4 of the other float 144 or 148 from rotor 110. As described further, opposing floats 140 may be differently ballasted so that buoyancy forces on floats provides a counter torque to balance an operating torque that operation of CycWEC system 100 creates.

Drag plates 150 are used to counter reaction forces produced during operation of CycWEC system 100. In general, each drag plate 150 opposes or resists movement of CycWEC system 100 in directions perpendicular to the rotation axis of rotor 100, and drag plates 150 may be mounted in many different arrangements, e.g., different positions and orientations on stator frame 130, so that the arrangement of drag plates 150 opposes motion along two perpendicular axes. Additionally, the arrangement of drag plates 150 may position drag of equal area on opposing sides of main shaft 112, such that force normal to the plates 150 do not generate additional shaft torque. For example, in FIG. 1-1 the area of plate 151 is equal to the areas of plate 153 on the opposite side of shaft 112. More generally, each drag plates 151, 152, 155, or 156 with a moment arm relative to shaft 112 may be paired with an equal-area drag plate 153, 154, 157, or 158 with an opposing moment arm relative to shaft 112.

Each drag plate 150 generally blocks the flow of water through the area of the drag plate 150 and thus resist movement or rotation of CycWEC system 100 that would move the drag plate in a direction perpendicular to the drag plate 150. In the example of FIG. 1, drag plates 151, 152, 153, and 154 are in an X-shaped configuration or arrangement 160 at one end of stator platform 130 and drag plates 155, 156, 157, and 158 are in an X-shaped configuration or arrangement 160 at the opposite end of stator platform 130. Both X-shaped arrangements 160 of plates 150 may be centered on the rotation axis of central shaft 112, and each X-shaped arrangement 160 includes drag plates 150 that resist movement along two orthogonal axes that are orthogonal to the rotation axis of rotor 110.

CycWEC rotor 110 in a typical installation includes two hydrofoils 114, each of which attach to central shaft 112 though two or more struts 116 so that foils 114 rotate around the axis of shaft 112 as shaft 112 rotates. Each strut 116 may further include a pitching mechanism 118 that may control and adjust the pitch angle of the attached foil 114 relative to strut 116. As described further, the pitch angle of foils 114 may be dynamically adjusted in a pattern or "pitching schedule" to maximize lift force or torque extraction throughout a wave cycle or to alter a net direction of the lift, e.g., for station keeping or depth control. In particular, a control system (not shown) such as a local or remote computer may be programmed to control pitching mechanisms 118 to select and implement a pitching schedule based on the current environmental conditions and the energy conversion requirements of CycWEC 100.

CycWEC system 100 may be deployed at a depth such that hydrofoils 114 remain below the surface of the ocean while rotor 110 rotates for wave energy conversion. The interaction of hydrofoils 114 with ocean waves passing above and through rotor 110 causes the lift that generates the shaft torque that rotates hydrofoils 114 and central shaft 112. Hydrofoils 114 experience a combination of rotational velocity and wave induced fluid velocity and produce net lift having a direction at a non-zero angle with the radial direction from the rotation axis of the rotor 110. The non-radial component to the lift produces shaft torque in the direction of rotation of shaft 112, and generator 120, which is attached to shaft 112, converts the rotational power driven through shaft 112 to electric power that can be used for any purpose.

FIGS. 1-1, 1-2, and 1-3 show a CycWEC system 100 including a frame 130, as described above, employing drag plates 150 configured in two X-shaped arrangements 160 at opposite ends of the long axis of stator frame 130. The X-shaped arrangements 160 create drag that particularly resists movement of stator frame 130 in directions perpendicular to a long axis of stator frame 130, the long axis corresponding to the rotation axis of a CycWEC that may be mounted in stator frame 130. The drag plates may have alternative arrangements that achieve similar resistance to motion along two orthogonal axes.

FIG. 2 shows an example of a stator frame 230 (without an attached CycWEC) having two sets of drag plates 251, 252, 253, and 254 (generically referred to as drag plates 250) in a T-shaped arrangements 260 that serve the same purpose as the X-shaped arrangements 160. In the illustrated orientation, drag plates 251 and 252 are horizontal and resist motion along a vertical axis, and drag plates 253 and 254 are vertical and resist motion along a horizontal axis. The opposed motions are motions perpendicular to the long axis of stator frame 230. Further, each drag plate 251 is positioned to have a moment arm relative to the rotation axis of CycWEC opposite to the moment arm of a nearby drag plate 252 relative to the rotation axis. Drag plates 251 and 252 may have equal areas so that a pair of drag plates 251 and 252 does produce a net torque about the rotation axis. Similarly, each drag plate 253 is positioned to have a moment arm relative to the rotation axis of CycWEC opposite to the moment arm of a nearby drag plate 254 relative to the rotation axis, and drag plates 253 and 254 may have equal areas so that a pair of drag plates 253 and 254 does produce a net torque about the rotation axis. These illustrated examples show drag plates 150 and 250 as being flat, but the shapes of the drag plates 150 or 250 may alternatively be varied. For example, a drag plate may form an arc, a circle or ring, or even spherical shapes.

The illustrated examples also show stator frames 130 or 230 that are shaped to extend the length of a CycWEC and connect both ends of the CycWEC rotor 110, which is not strictly necessary but provides added strength and stability to the mounting of rotor 110. In another alternative, the stator frame 130 or 230 may be split into two independent parts attached to each end of the rotor 110. FIG. 3 shows an example of a stator frame 330 having a two-piece construction in which one part 332 of stator fame frame 330 includes a pair of floats 140 and an X-shaped arrangement 362 of drag plates 150 that connect to one end of a CycWEC. Another part 334 of stator frame 330, which is not directly connected to portion 332 by structure of frame 330, includes another pair of floats 140 and another X-shaped arrangement 364 of drag plates 150 that connect to the other end of the CycWEC. A CycWEC (not shown) of any desired length may have opposite ends, e.g., the stators of generators at opposite ends of a rotor, respectively connected to portions 332 and 334 of stator frame 330, and the assembled CycWEC system may rely on the CycWEC to structurally interconnect the independent parts 332 and 334 of stator frame 330.

Operating Torque Cancellation

Figures 1, 4:
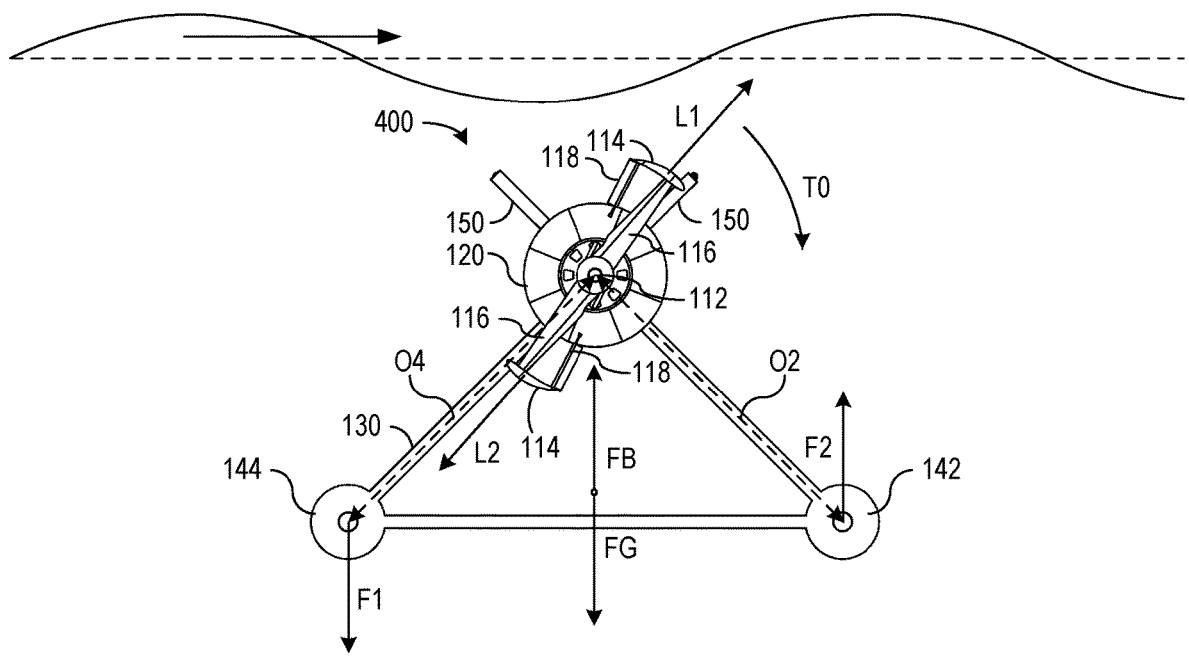
Figures 2, 4:
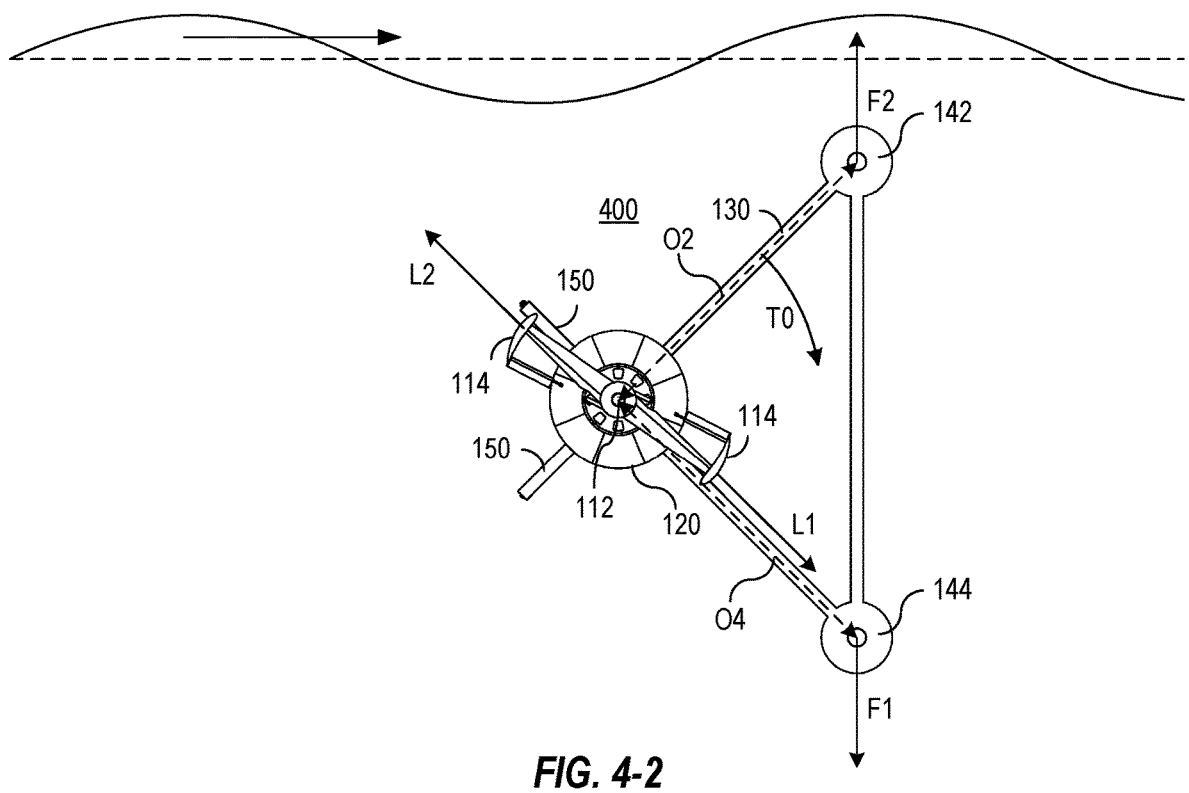

FIG. 4-1 illustrates a CycWEC system 400 including a stator frame 130 such as described above. CycWEC system 400 is generally subject to gravitational and buoyancy forces. Gravitational forces on an extended body are distributed along the body, but FIG. 4-1 illustrates a gravitational force FG and a buoyancy force FB acting on a center of gravity of CycWEC 400. Forces FG and FB represent the gravitational and buoyancy forces associated with all portions of CycWEC 400. Forces FB and FG may be equal and opposite to provide CycWEC 400 neutral buoyancy at a desired operating depth for use of CycWEC system 400 in an operating mode. In FIG. 4-1, a left float 144 has been ballasted to be negatively buoyant, creating a downward force F1, while a right float 142 is positively buoyant, creating an upward force F2. (Forces F1 and F2 may be considered, not as absolute buoyancy forces, but a representation of a difference between the absolute buoyancies of floats 144 and 142.) In practice, the difference in buoyancy may be achieved by filling left float 144 entirely or partially with water (or some other fluid), and filling the right float 142 partially or entirely with air (or a gas or a fluid less dense than water). This same principle of operation can work for any number of other combinations of fluids or gases in floats 140 as long as the construction material for floats 140 and the liquids and gases in the floats 140 have the required properties, e.g., suitable densities. Water and air are suggested for their wide availability and simplicity.

A vector sum of all buoyancy forces (including forces F1 and F2) on stator frame 130 generally need to balance the force of gravity FG on CycWEC 400 to keep stator frame 130 stationary and keep stator frame 130 from sinking or rising to the surface. As noted above, gravitational and buoyancy forces FG and FB on CycWEC system 400 as a whole may be balanced to provide neutral buoyancy for CycWEC system 400 and prevent sinking or rising of the CycWEC. A vector sum of the torques generated by all the forces on stator frame 130 must also be balanced to prevent a stationary stator frame 130 from rotating. In the example of FIG. 4-1, float 144 has negative buoyancy so that float 144 tends to sink towards the ocean floor, and float 142 is positively buoyant so that float 142 tends to rise towards the ocean surface. As a result, if no shaft torque T0 is being generated, the orientation of CycWEC 400 is not stable, and CycWEC 400 tends to rotate counterclockwise until an equilibrium position is reached. FIG. 4-2 shows an example of an equilibrium position where the positive and negative buoyancy forces F2 and F1 are lined up and no longer produce a net torque. CycWEC system 400 may remain stationary in the equilibrium position of FIG. 4-2 as long as CycWEC system 400 is overall neutrally buoyant and CycWEC system 400 is not generating torque from energy conversion operation.

Ocean waves that drive rotation of the rotor of CycWEC 400 produce a non-zero shaft torque T0 in the clockwise direction in the orientation of FIG. 4-2, and the resistance or reaction of generator 120 to the rotation of the rotor tends to cause CycWEC system 400 as a whole to rotate clockwise. As CycWEC system 400 rotates clockwise from the orientation shown in FIG. 4-2, a horizontal separation between buoyancy forces F1 and F2 increases, producing an increasing counter torque in the counterclockwise direction. The clockwise rotation that non-zero operating torque T0 causes may continue until the counter torque from unbalanced buoyancy forces F1 and F2 is equal to (or greater than) operating torque T0. FIG. 4-1 shows a rotational position of CycWEC system 400 in which the counter torque produced by the float forces F1 and F2 is largest, and FIG. 4-2 shows a rotational position of CycWEC system 400 in which the counter torque produced by the float forces F1 and F2 is zero (or smallest). If the largest counter torque produced by forces F1 and F2 is greater than the operating torque T0, CycWEC 400 rotates to and settles at an equilibrium position in which operating torque T0 is equal to the counter torque that the forces F1 and F2 produce. The equilibrium is generally achieved at an intermediate rotational orientation of CycWEC system 400 between the rotational orientations shown in FIGS. 4-1 and 4-2. If buoyancy forces F1 and F2 are set to provide a sufficiently large maximum counter torque, no active control system is needed to achieve the equilibrium that holds stator frame 130 in position for operation. Additionally, given the geometry of floats 140 (particularly the offsets from central shaft 112) and known magnitudes of the different buoyancy forces, e.g., forces F1 and F2, the rotational orientation of stator frame 130 could be used to measure the shaft torque being produced.

The example of CycWEC system 400 of FIGS. 4-1 and 4-2 employ two offset floats that are differently ballasted to create counter torque. Alternatively, more than two floats or other flotation structures may be ballasted to provide counter torque. For example, CycWEC 100 has four floats 142, 144, 146, and 148, and in one implementation, floats 142 and 146 on one side of stator frame 130 that differ from the buoyancy of the floats 144 and 148 on the other side of stator frame 130. More general, any number of floats or other buoyant or floatation structures may be employed with structures offset to one side of the CycWEC rotor having a net opposite buoyancy from structures offset to the other side of the CycWEC rotor.

Drag Plates and Lift Force Cancellation

Lift L1 and L2 generated by hydrofoils 114 as shown in FIGS. 4-1 and 4-2 not only produce operating torque T0, which is countered using differential ballasts, but may also produce a net force that needs to be countered. As shown, multiple foils 114 in a rotor may be arranged to produce multiple lifts L1 and L2 that tend to partially cancel, but in general, the lift on one of the foils 114 may be greater than the lift on the other foils depending on the orientation of foils 114 and the phase of the interacting ocean wave. For typical operation with two blades 114, one blade 114 is at positive pitch angle when the other blade 114 at negative pitch angle, e.g., such that lift L1 points outward, and lift L2 points inward. Both blades 114 have a slight tilt in the direction of rotation so that lift from both blades 114 produces positive shaft torque. Thus, the non-radial portions of the lift forces L1 and L2 add rather than subtract. As a result, even multiple foils 114 in a symmetric arrangement generally produce a net non-zero lift that varies in magnitude and direction over time.

Stator frame employs drag plates 150, which may produce resistance forces due to the well-known added mass effect. With the added mass effect, moving a drag plate through a fluid in direction normal to the surface of the drag plate also requires moving fluid, e.g., sea water for an ocean-operated CycWEC, in order for any motion to occur. Since the mass of a static fluid needs to be accelerated to move, the inertia of the fluid mass resists motion of drag plates 150 in directions perpendicular to their respective surfaces. The X-shaped and T-shaped arrangements of drag plates 150 described above thus resist movement in all directions perpendicular to the central shaft of the CycWEC. To a first order approximation, the added mass effect is proportional to the area of the drag plate, and drag plates 150 can thus be designed or sized to suitably resist or counter expected lift and other forces on CycWEC system 400. In CycWEC system 400, the amplitudes of lift forces L1 and L2 from hydrofoils 114 are predictable based on the parameters of CycWEC system 400 and anticipated waves usable for wave energy conversion, and drag plates 150 may be sized to limit movement of CycWEC system 400 that lift forces L1 and L2 might otherwise cause.

Drag plates 150 reduce the motion of CycWEC 400 but do not need to stop all motion. Due to the cyclic nature of lift forces L1 and L2, the direction of the net lift force rotates with the orientation of the rotor of CycWEC system 400, and the main shaft 112 will typically move in a circular fashion as a result. The diameter of this circle depends in a linear fashion on the magnitude of the net lift force and inversely on the areas of drag plates 150. The cyclic motion may radiate waves due to the motion of the drag plates relative to the surrounding water. The radiated waves may reduce the overall wave energy conversion efficiency, but since the movement may be relatively small for most situations, the loss of efficiency may be insignificant in most applications. As the direction of the net lift force rotates with the shaft, the net lift force does not cause a net average motion in the horizontal or vertical direction, so that CycWEC 400 maintains an average position over time. Therefore, CycWEC system 400 may operate as a floating device without the need for any attachment to the ocean floor as all forces are internally compensated for by drag plates 150.

Orientation and Submergence

Optimal energy conversion performance of a CycWEC generally requires that the CycWEC main shaft 112 be oriented parallel to the crests of the incoming waves. One way that CycWEC 100 can achieve and maintain optimal orientation is by differentially adjusting the blade pitch on the left and right side of foils 114, effectively twisting the blades. U.S. Pat. No. 7,686,583, entitled "Cyclical Wave Energy Converter," which is hereby incorporated by reference in its entirety, further discloses how to use blade twisting to reorient a CycWEC.

Figures 1, 5:
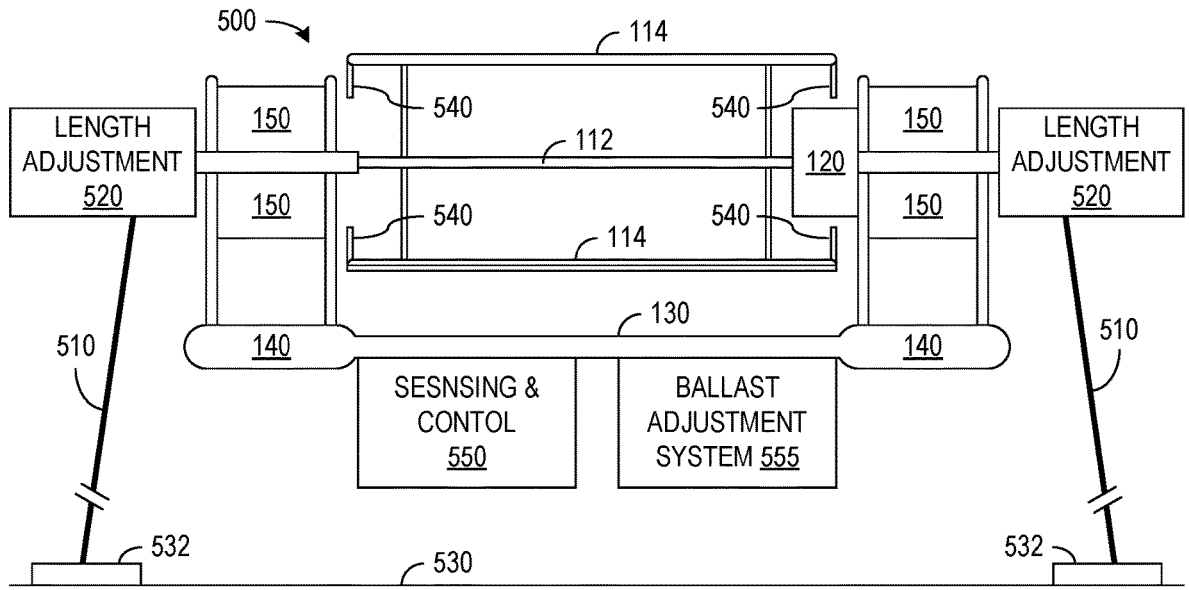
Figures 2, 5:
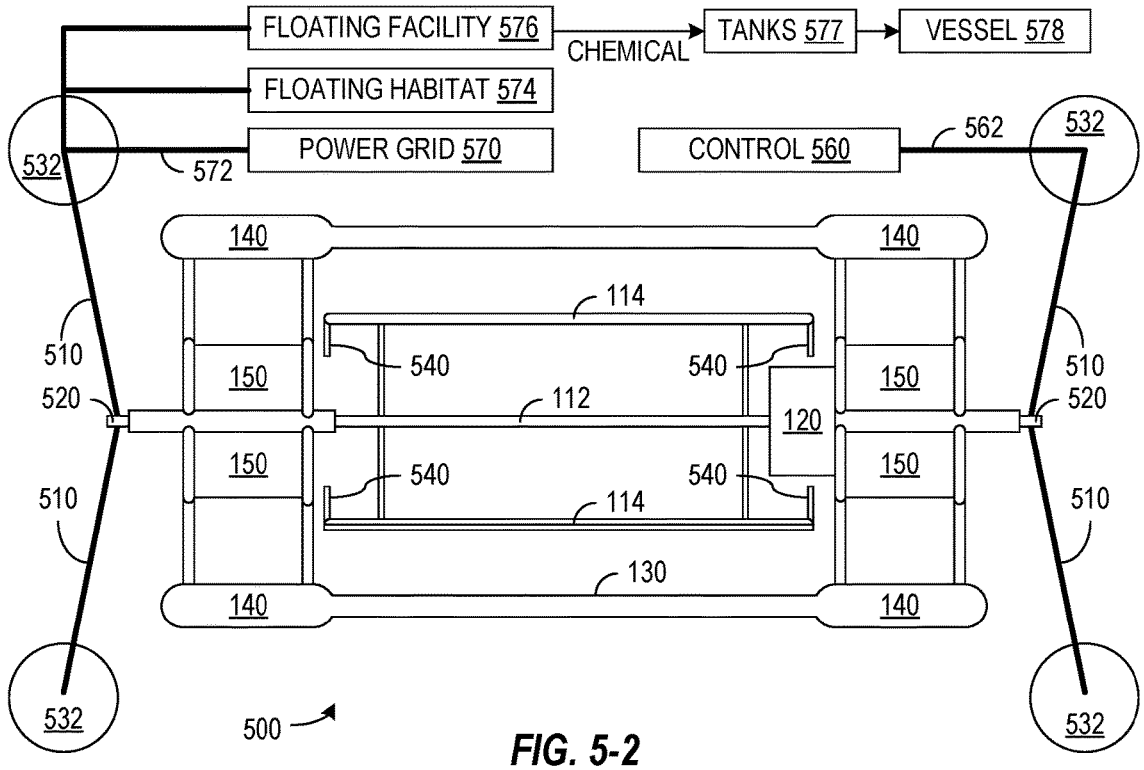

In accordance with an aspect of the present disclosure, flaps at the ends of foils 114, or at the trailing edge of struts 116 can be used. FIGS. 5-1 and 5-2 show side and top views of a CycWEC system 500 having flaps 540 extending from the ends of hydrofoils 114. Flaps 540 are generally vertical plates that operate as rudders, and a sensing and control system 550 can actively operate flaps 540 to generate a torque around the vertical axis of CycWEC system 500, and the torque can be used to reorient the direction of shaft 112 to adjust CycWEC system 500 for waves from different directions. In particular, sensing and control system 550 may include sensors that sense the environment, e.g., the direction, wavelength, and amplitude of ocean waves, around CycWEC system 500 and include a control system, e.g., a computer system that is on or remote from stator frame 130, that executes a process to optimize or achieve desired performance from CycWEC system 500.

In accordance with yet another aspect of the current disclosure, a CycWEC system can use multiple mooring lines, which may be differentially adjusted in length. For example, CycWEC system 500 of FIGS. 5-1 and 5-2 has mooring lines 510 attached to length adjustment systems 520 at the ends of CycWEC system 500. In a standard multi-point mooring system, mooring lines 510 extend from length adjustment systems 520 to foundations 532 on the ocean floor 530. (FIGS. 5-1 and 5-2 specifically show a four-point mooring system, but a three-point mooring system or a mooring system having any number of lines 510 attached to foundations 532 could alternatively be employed.) Length adjustment systems 520 may include winches or real systems that are capable of independently drawing in or feeding out lengths of mooring lines 510. Control system 550 may operate length control systems 520 to control the location, e.g., depth, longitude, and latitude, of each end of floating CycWEC 500. The orientation and depth of CycWEC 500 can be controlled or influenced by hauling in or releasing lengths of particular mooring lines 510 to thus adjusted or orientation or raise or lower main shaft 112. Alternatively, mooring lines 510 may provide some freedom of movement of the ends of CycWEC 500, and control system 550 can control the depth, position, or orientation of CycWEC system 500 using other techniques, e.g., actively controlling of the pitching schedule of hydrofoils 114 and steering flaps 540.

Control of the submergence of the CycWEC is necessary for optimal performance and may be needed for storm survival. Submergence control can be accomplished using mooring lines 510, e.g., hauling in lines 510 to lower CycWEC 500 to a safe depth. Additionally or alternatively, control system 550 may operate a ballast adjustment system 555 to fine tune of the overall buoyancy, e.g., buoyancy force FB, in combination with active adjustment of the pitching schedule of hydrofoils 114 to produce a net lift and adjust an operating depth for an operating mode of a CycWEC system, lower the CycWEC system to a safe depth for a safe mode during storms, or raise the CycWEC system to float with the CycWEC above the water for a service mode. Ballast adjustment system 555 may, for example, include pumps or pressure systems that can move denser material, e.g., water, or less dense material, e.g., air, to change and adjust the overall buoyancy of floats 140 and the differential buoyancies of opposing floats 140. Processes for a control system, such as control system 550, to control a pitching cycle for a CycWEC are further described in the U.S. Pat. No. 7,686,583. Since efficient operation of a CycWEC system generally requires both of buoyancy and pitch control for other purposes, i.e., efficient wave cancellation requires blade pitch control and shaft torque compensation requires buoyancy control, the control of submergence depth becomes merely a software control feature that may be implemented in existing control systems and that requires no additional actuator hardware beyond that used for these other functions.

Station Keeping

An ocean setting typically experience phenomena that apply additional forces that may affect the position of a free floating CycWEC. These phenomena include wave induced drift currents, tidal currents, and other wind or geophysical induced ocean currents present at the location where the CycWEC is deployed. A floating CycWEC needs to compensate for variable drift forces if the position of the CycWEC is to remain constant. In accordance with an aspect of the current disclosure, station keeping may be maintained using mooring lines such as illustrated in FIGS. 5-1 and 5-2 and/or using dynamic position keeping that adjusts the pitching schedule or pattern of the hydrofoils as they rotate in order to produce a net lift force that opposes the external forces from the environment.

A mooring line system as shown in FIGS. 5-1 and 5-2 may simply include mooring lines 510 attaching a CycWEC system 500 to one or more anchors 532 on the ocean floor 530, so that the mooring lines 510 prevent CycWEC 500 from drifting off due to the local or variable currents. However, mooring lines 510 may permit CycWEC system 500 to cover a rather large range of positions in deep water as a result, which may necessitate wide spacing between devices if multiple CycWECs are deployed in the same area. Accordingly, control system 550 may be needed to control and vary the pitching cycle as needed to maintain a desired position of CycWEC 500.

Preferred locations for attaching mooring lines 510 would be at either or both ends of stator platform 130, where the ends (and length adjustment systems 520) are along of the axis of a main shaft 112. Connections at the ends permit CycWEC 500 to rotate around the axis of center shaft 112 and compensate for different amounts of shaft torque without interfering with the mooring lines 510 or operation of length adjustment systems 520.

An added advantage of the use of mooring line(s) 510 is that the mooring line 510 may be used as power and/or data connection to transfer the power produced by generator 130 through a subsea cable 572 to a power grid 570 on the ocean shore or communicate data and control signals through a wire data link 562 to a control system 560 that operates CycWEC 500. (In general, control functions of systems 550 and 560 may be integrated into the same system at a single location or may be distributed in any desired fashion.) Electrical power, instead of being transmitted to shore, may be used at a facility 576 adjacent to CycWEC 500. For example, a floating habitat 574 may be connected to use the electrical power from CycWEC 500. Alternatively, the facilities 576 could include chemical production equipment that uses the electrical energy to produce a chemical that is stored in tanks 577 on or near the CycWEC. Chemical storage 577 could, for example, use electrical production of hydrogen or ammonia from air and water. Tankers or other ships or vessels 578 could transport the produced chemical as cargo, or production and storage of a fuel at the CycWEC 500 could provide a station for mid-ocean refueling of vessels 578. With chemical production and storage 577, the CycWEC 500 does not require a power line connection 572 to shore.

Dynamic position keeping can be implemented using sensor information, e.g., a GPS based measurement, to determine the exact position of CycWEC, and then having control module 550 or 560 adjust the pitch schedule or pattern of the CycWEC blades 114 to generate necessary compensation forces if a difference is detected between measured and desired (target) position of the device. CycWEC system 500 again requires no additional actuator hardware beyond the blade pitch actuators which are needed for efficient wave cancellation anyway. An additional mooring line 510 may still be used as a fail-safe backup to prevent the loss of the device due to system or power failure of the active dynamic position keeping system. In a worst case, CycWEC 500 could sink, which is desirable compared to the other worst-case scenarios, e.g., where the CycWEC drifts off and or is washed ashore, which would likely destroy the CycWEC. With mooring lines, a fail-safe mode of operation in moderate water depths might be to sink the CycWEC to the ocean floor and let the CycWEC rest awaiting retrieval and repaired. In deep water, sinking may not be a failsafe condition because the increased water pressure on the ocean floor may crush the CycWEC.

Operation

Figure 6:
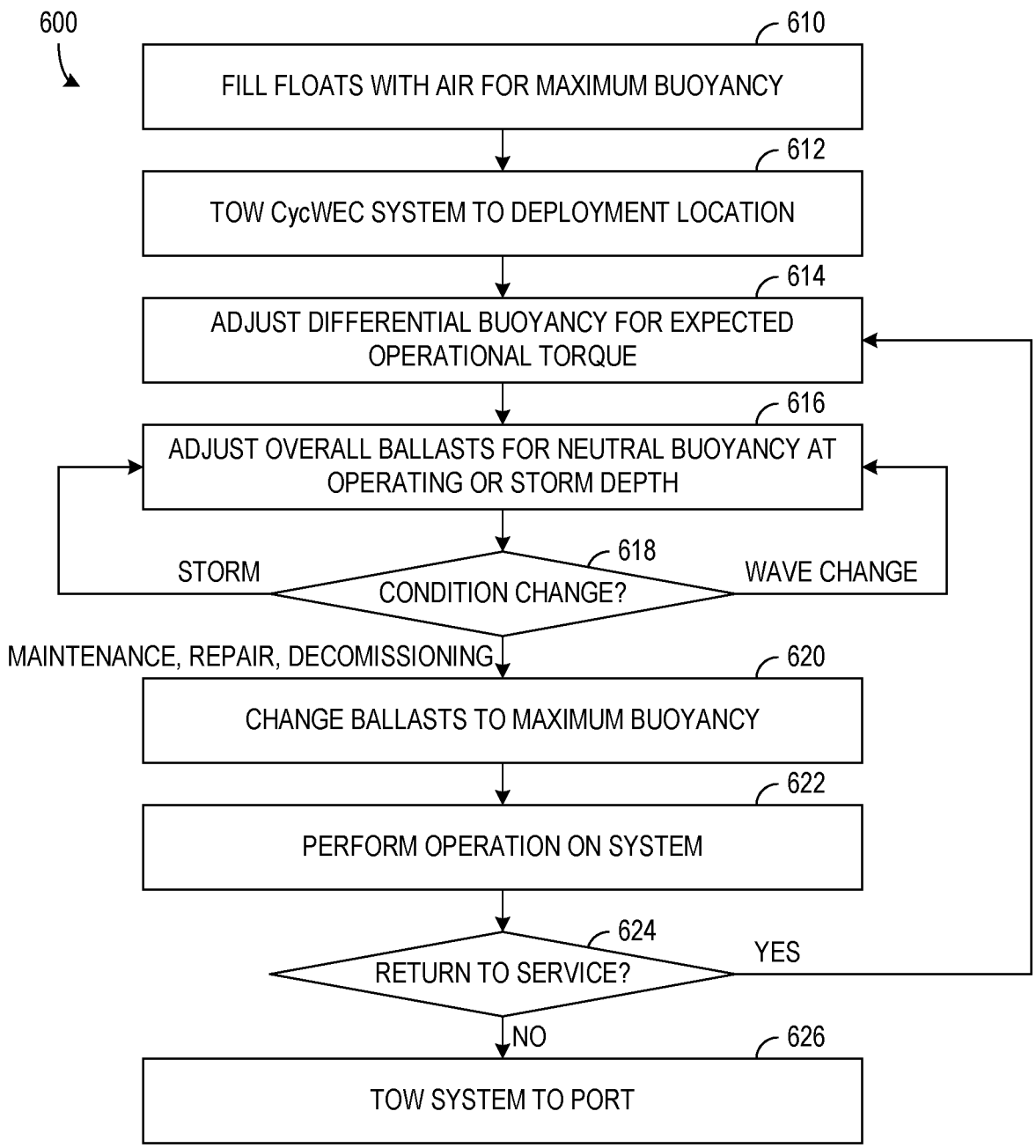
FIG. 6 is a flow diagram of an operating process for a floating cycloidal wave energy converter system in accordance with an example of the present disclosure.

A stator frame including floats, e.g., four floats 140 in CycWEC system 100 of FIG. 1, also has the advantage of accommodating other important operations, particularly commissioning and decommissioning of the CycWEC, as well as maintenance. FIG. 6, for example, is a flow diagram a process for operating a floating CycWEC system in accordance with an example of the present disclosure. Initially, in a process block 610, the floats of the CycWEC system may be filled with air to achieve maximum buoyancy, so that the CycWEC system floats with all or at least a portion of the CycWEC system above water. If the total float volume is designed to provide enough buoyancy to carry the weight of the entire CycWEC system including the stator frame, CycWEC system 100 will become a floating pontoon type platform or boat, ideally with the rotor and generator lifted above the water. In this state, the CycWEC system 100 can be towed (in a process block 612) from a launch harbor to the intended deployment location during a commissioning operation. At the deployment location, a process block 614 can adjust the differential buoyancy of the floatation structure for the expected operating torque, and a process block 618 can adjust the overall buoyancy of the CycWEC system to lower the CycWEC to the target operating depth (or to a safe depth if a storm or other surface event is expected.) At the operating depth, the CycWEC system can convert wave energy to electric energy that may be electrically conducted to a user or power grid or that may be stored in chemical form on or near the CycWEC.

Operation of the CycWEC system may continue until a condition change is detected in a process block 618. For example, if a change in prevailing waves is detected, the operating depth may need to be changed, and process 600 returns and fine tunes the overall buoyancy of the CycWEC system for the new operating depth. At the same time, the orientation or pitching schedule of the CycWEC system may be adjusted for the new wave conditions. If a storm warning or other danger is detected, process 600 may return to process block 618 to adjust overall buoyancy of the CycWEC system to lower the CycWEC system to a safe depth where the storm or other surface condition will not damage the CycWEC system. If process block 618 determines maintenance, repair, or decommissioning is needed, the floatation structure of the CycWEC system may be returned to maximum buoyancy in a process block 620. The air needed for this operation can be either obtained by means of a hose that is floated to the surface for this purpose in combination with a pump, or by expanding compressed air stored in the CycWEC for this purpose. The maximum buoyancy of floatation structure raises the CycWEC system to the ocean surface, which provides free access to all components of the CycWEC for a maintenance, repair, or decommissioning operation performed in a process block 622. If the CycWEC is ready to return to service, process 600 branches from a process block 624 back to buoyancy setting in process blocks 614 and 616. If the CycWEC is to be decommissioned or needs extensive repair, the floating CycWEC system may be towed back to port in a process block 626.

In summary, floating CycWEC systems as disclosed herein may support all operations necessary for deployment and operation of a CycWEC in water of any depth. The CycWEC systems have particular advantages in deep water installations where other mooring designs may not be feasible or economical. Since mooring-free station keeping is possible, the CycWEC systems can conceptually operate without installation of any hardware on the ocean floor, and extract power from ocean waves at any location where there are waves. In comparison to other installation methods, a floating mooring design uses less hardware but may require more sophisticated control systems.

Each of the modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A system comprising:
   a wave energy converter including a rotor on a central shaft connected to a generator, the rotor including one or more hydrofoils extending parallel to the central shaft and positioned to interact with waves, thereby creating lift that rotates the rotor and the central shaft; and
   a frame on which the generator is fixedly mounted, with the rotor being able to rotate about a rotation axis of the central shaft to drive the generator, the frame comprising:
      a first structure attached to the frame at a first offset from the rotation axis, the first structure having a first buoyancy that is adjustable by filling the first structure with an adjustable amount of a gas, liquid, or solid material; and
      a second structure attached to the frame at a second offset from the rotation axis, the second structure having a second buoyancy that is adjustable by filling the first structure with an adjustable amount of a gas, liquid, or solid material, wherein:
   the system has a first ballast configuration in which the first buoyancy and the second buoyancy cause the frame to float in water with at least a portion of the wave energy converter above a surface of the water;
   the system has a second ballast configuration in which the first buoyancy and the second buoyancy are controlled to submerge the wave energy converter in the water, wherein a buoyancy difference is constant, the buoyancy difference being a difference between the first buoyancy and the second buoyancy, the buoyancy difference causing a first torque on the frame about the rotation axis that opposes a second torque on the frame produced by operation of the wave energy converter; and wherein
   the first offset and the second offset are oriented so that the first torque increases in magnitude in response to rotation of the frame by the second torque, the first torque thereby limiting a range of rotation of the frame that operation of the wave energy converter causes.

2. The system of claim 1, wherein:
   the first structure comprises a first float;
   the second structure comprises a second float; and
   in the second ballast configuration, the first float is ballasted so that the first buoyancy is a positive buoyancy in water, and the second float is ballasted so that the second buoyancy is a negative buoyancy in water.

3. The system of claim 2, wherein:
- the first float and the second float are adjacent to a first end of the rotor;
- the first structure further comprises a third float that is adjacent to a second end of the rotor; and
- the second structure further comprises a fourth float that is adjacent to the second end of the rotor.

4. The system of claim 1, wherein the frame further comprises a plurality of drag plates, the drag plates being arranged to resist movement through water along a first axis and a second axis, the first axis and the second axis being perpendicular to the rotation axis.

5. The system of claim 4, wherein the plurality of drag plates includes:
- a first set of drag plates adjacent to a first end of the rotor; and
- a second set of drag plates adjacent to a second end of the rotor.

6. The system of claim 5, wherein the first set of drag plates form one of a X-shaped arrangement and a T-shaped arrangement.

7. The system of claim 1, further comprising a ballast adjustment system connected to the first structure and to the second structure, the ballast adjustment system operating to fill the first structure and the second structure with adjustable amounts of gas, liquid, or solid material to thereby adjust the first buoyancy and the second buoyancy and switch the system between the first ballast configuration and the second ballast configuration.

8. The system of claim 7, wherein for the second ballast configuration, the ballast adjustment system controls depth of the system by adjusting the first and second buoyancies while maintaining the buoyancy difference constant.

9. The system of claim 7, wherein the system further has a service ballast configuration, wherein for the service ballast configuration, the ballast adjustment system adjusts the first and second buoyancies to cause the system to float with the wave energy converter fully out of the water.

10. The system of claim 7, wherein the system further has a safe ballast configuration, wherein for the safe ballast configuration, the ballast adjustment system adjusts the first and second buoyancies to submerge the system to a depth that protects the system from damage from a storm.

11. A process for operating a wave energy converter (WEC), the WEC including
- a generator and
- a rotor,
- wherein the generator is mounted on a frame,
- the rotor includes a central shaft connected to drive the generator and further includes one or more hydrofoils extending parallel to the central shaft, and
- the frame includes a first floatation structure at a first offset from a rotation axis of the central shaft and includes a second floatation structure at a second offset from the rotation axis of the central shaft, the process comprising:
- floating the WEC to a deployment location in a body of water while the WEC is mounted on the frame, the WEC, while floating, being lifted at least partially out of the body of water by the first and second floatation structures;
- ballasting the frame at the deployment location so that the WEC becomes submerged to an operating depth, the ballasting including maintaining a constant buoyancy difference, the buoyancy difference being a difference between a first buoyancy of the first floatation structure and a second buoyancy of the second floatation structure, the buoyancy difference causing a first torque on the frame about the rotation axis of the central shaft; and
- operating the WEC in waves of the body of water, wherein operating the WEC causes a second torque on the frame about the rotation axis, the second torque varying depending on variations in the waves, wherein
- the first floatation structure and the second floatation structure are oriented so that the first torque increases in magnitude in response to rotation of the frame by the second torque, the first torque thereby limiting a range of rotation of the frame during the operating of the WEC in the waves.

12. The process of claim 11, further comprising:
- adjusting the first buoyancy and the second buoyancy by adjusting ballast in the first and second floatation structures, respectively, so that the WEC rises to a surface of the body of water; and
- performing an operation on the WEC at the surface, the operation comprising one or more of maintenance, repair, or decommissioning operations.

13. The process of claim 11, further comprising attaching one or more lines between the frame and a floor of the body of water, the one or more lines keeping the WEC at the deployment location.

14. The process of claim 13, wherein the one or more lines includes a power line connected to carry electric power from the generator.

15. The process of claim 11, further comprising altering one or more pitches of one or more hydrofoils in the rotor while the rotor rotates, wherein altering the pitches changes lift forces generated from interaction of the one or more hydrofoils with waves.

16. The process of claim 15, wherein the altering of the one or more pitches causes an average of the lift forces to maintain a position of the WEC against external forces a surrounding environment applies to the WEC.

17. The process of claim 15, wherein the altering of the one or more pitches causes an average of the lift forces to maintain the WEC at the operating depth or to move the WEC to the operating depth.

18. The process of claim 15, further comprising operating the generator to convert wave energy into electrical power.

19. The process of claim 18, further comprising using the electrical power in a floating facility or in a floating habitat adjacent to the WEC.

20. The process of claim 18, further comprising using the electrical power to produce and store a chemical in a location adjacent to the WEC.

21. The process of claim 20, further comprising offloading the chemical from the storage to a vessel, wherein in the vessel, the chemical is one or more of cargo and fuel for the vessel.

* * * * *